Feb. 16, 1932.  E. OTTON  1,845,002
SEALING MEANS FOR STOP VALVES, COCKS, FAUCETS, AND THE LIKE
Filed Jan. 7, 1930
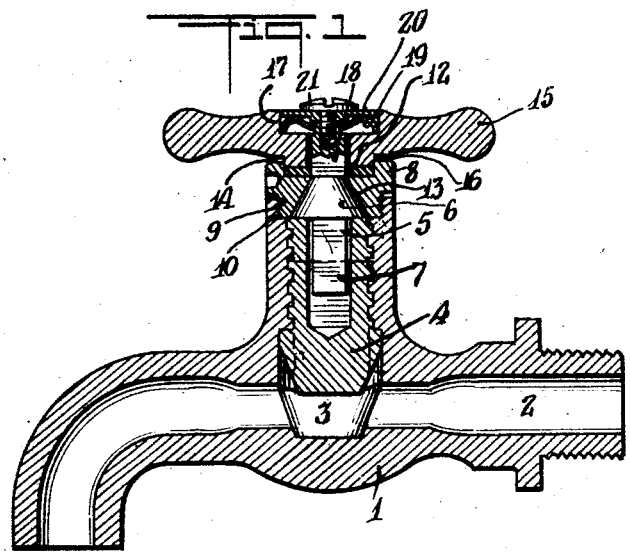
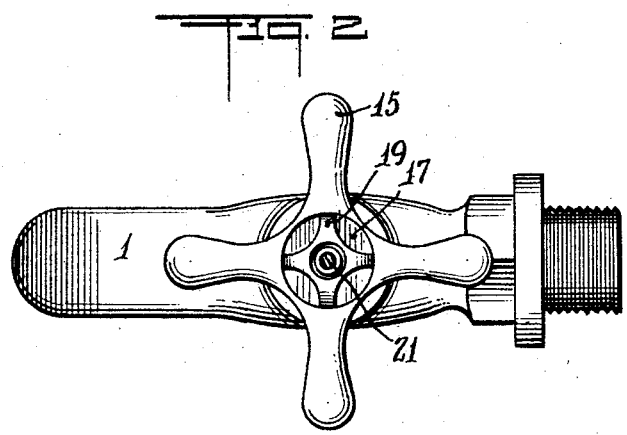
Edward Otton
INVENTOR
BY Robert B. Killgore
ATTORNEY Patented Feb. 16, 1932

1,845,002

UNITED STATES PATENT OFFICE

EDWARD OTTON, OF LONDON, ENGLAND, ASSIGNOR TO INTERNATIONAL PATENTS, LTD., OF LONDON, ENGLAND, A LIMITED COMPANY OF GREAT BRITAIN

SEALING MEANS FOR STOP VALVES, COCKS, FAUCETS, AND THE LIKE

Application filed January 7, 1930. Serial No. 419,037.

My invention relates to stop valves, cocks or faucets for controlling the flow of fluids and it is my object to provide means for sealing the valve to prevent leakage between the operating stem and the cap in a simple, cheap, neat and sightly manner and in which no packing is used, whereby the joint is made permanently leakless and in which wear on the parts will be automatically taken up.

In the drawings Fig. 1 is a sectional view of a water faucet embodying my invention; and Fig. 2 a top view of the structure of Fig. 1 with the pressure plate removed to expose the take-up spring.

The faucet shown is of the ordinary throughway bore type having a body 1, which is provided with a throughway bore 2. The body has an enlarged conical seat 3 leading into the bore and is internally threaded above the valve seat.

The valve proper is a cone plug 4 and has a threaded upper portion which engages the body thread and is provided with a squared socket therein.

The valve stem 5 has an enlarged or conical portion 6 near its upper end and a squared end 7 which loosely engages the squared socket in the plug 4.

The cap 8 is threaded at 9 and is screwed into the socket 10 in the open, upper end of the body 1. The upper end of the valve stem 5 passes through an opening 12 in the cap. The cap has an enlarged or conical socket 13 in its lower or inner face which receives its counterpart, the enlarged or conical part 6 of the valve stem 5.

The upper face of the cap is pocketed at 14.

The operating handle 15 has a boss 16 on its lower face and a pocket 17 in its upper face and engages the squared upper end 18 of the valve stem with a sliding fit, the boss 16 entering the pocket 14.

A spring 19 is laid in the pocket 17 around the valve stem 5. The leaf spring shown is a sheet metal spring with downwardly extending legs but I do not limit myself thereto as other forms of springs may be substituted without departing from my invention, the form shown being preferred on account of the small space occupied by it.

An apertured pressure plate 20 is placed above the valve stem and over the spring. A screw 21 bearing on the pressure plate and entering a tapped hole in the end of the valve stem serves to compress the spring between the pressure plate 20 and the bottom of the pocket 17 in the operating handle, the sliding fit between the operating handle and the stem permitting the spring to draw the enlarged or conical portion 6 of the valve stem firmly into its seat in the cap 8 and form a leak proof connection or joint between the stem and cap, which always remains tight as the contact is rotating metal to metal which always wears itself into a more perfect fit, while the spring draws the stem enlargement into its seat automatically to compensate for wear.

In operation the valve stem is rotated by the operating handle and the plug is run up the body threads and off its seat, the lower end of the stem telescoping in the plug. The enlargement on the upper end of the stem engaging the seat in the cap makes a tight joint at that point and prevents leakage or dripping when the valve is open.

My invention obviates the use of any packing material which requires replacement and any stuffing glands which require drawing up from time to time. The spring which seats the sealing means is inside the valve handle where it cannot be injured and as it occupies a very small space the valve as a whole has a neat appearance without unsightly projections.

As the whole valve is made up of parts which can be made on ordinary screw machines by straight turning the cost of production is very low.

I claim:—

A stop valve or the like comprising a valve body having a straight through bore and a vertical, tubular, internally threaded portion, the bore being conically enlarged below said tubular portion, a conical plug adapted to enter and plug the enlargement in the bore and provided with a socket in its upper end and an external thread engaging the threaded portion of the body, a cap for the upper end of the tubular portion of the body having a tapered socket on its inner surface, a stem slidable in but rotatable with said plug portion and extending through said cap, a cone on said stem engaging said tapered socket, an operating handle slidable on but rotatable with said stem and provided with a recess on its upper face around said stem, a spring in said recess and means for compressing said spring whereby said stem cone is drawn into contact with said socket.

In testimony whereof I have hereunto subscribed my name.

EDWARD OTTON.